W. Porter.
Saw Gummer.

Nº 24,820.  Patented Jul. 19, 1859.

Witnesses:
Celicia Emery
A L Sampson

Inventor:
William Porter

UNITED STATES PATENT OFFICE.

WILLIAM PORTER, OF MEXICO, NEW YORK.

SAW-GUMMER.

Specification of Letters Patent No. 24,820, dated July 19, 1859.

*To all whom it may concern:*

Be it known that I, WILLIAM PORTER, of Mexico, in the county of Oswego and State of New York, have invented a new and Improved Saw-Gummer for Gumming Saws Either Circular or Straight; and I do hereby declare that the following is a full and exact description of the construction and operation of the same, reference being had to the accompanying drawings and to letters of reference marked thereon.

Figure 1:
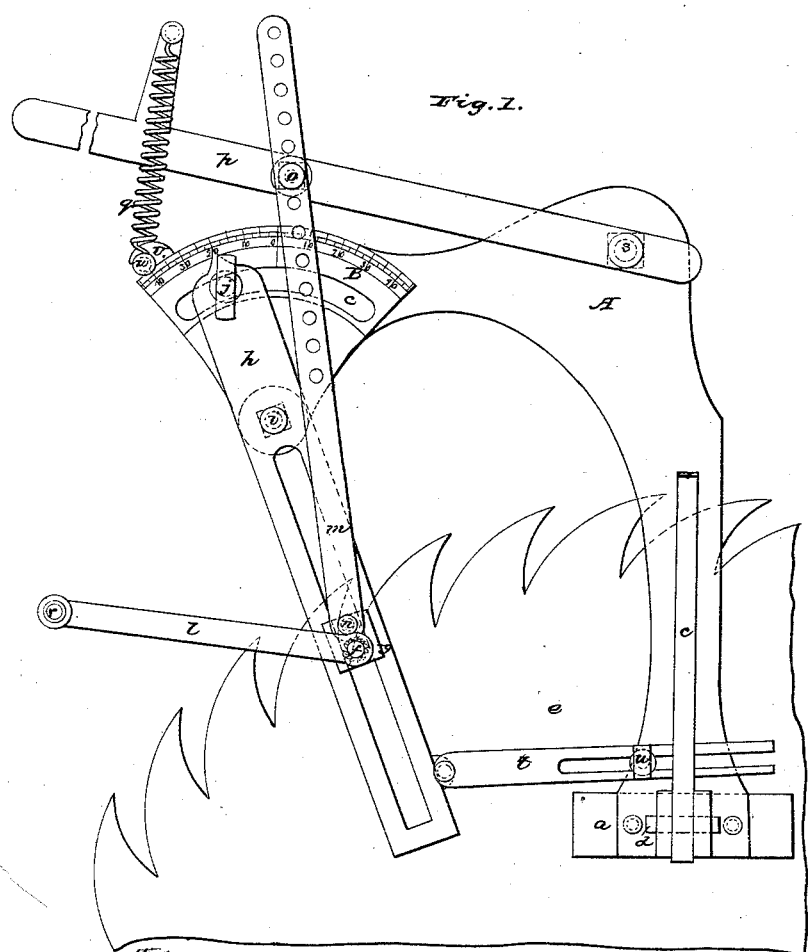
Figure 2:
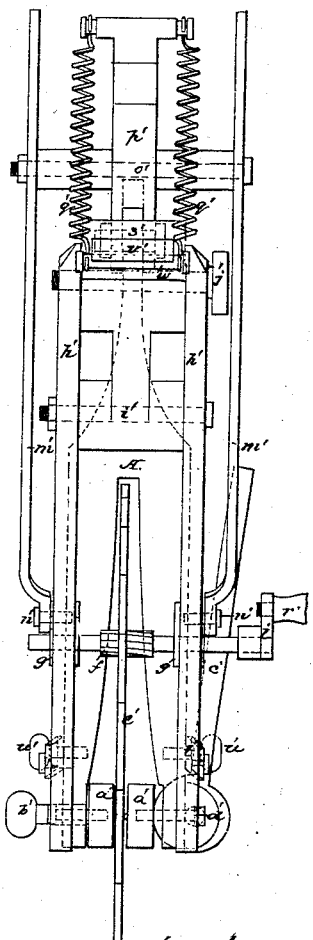

Figure 1, is a side view; Fig. 2, is a vertical end view.

Like figures represent like parts.

The nature of my invention consists in so constructing and arranging a series of guide bars hereinafter described, so that, that portion of any saw between the teeth thereof, called by mechanics the gum, may be cut away, without injury to said teeth, in any direction required.

It also consist in arranging and combining two guide bars with a lever, and coiled springs hereinafter described, so that, a continued downward pressure is had upon a bur as it cuts away the gum aforesaid.

It also consists in the arrangement of an index so as to give any required direction to the bars holding the bur or cutter.

It, also, consists in the arrangement of plates, set screws, and an eccentric hereinafter described so that the entire machine may be easily and strongly adjusted to any saw in a quick and effectual manner.

Having thus set forth the leading features in my machine I will proceed to detail its construction.

I construct my machine of any kind of material thought best to be used.

(A) Fig. 1, is the frame made in the shape as there shown. Upon that part of this frame projecting over the circular saw (e) I construct an index (B), which is divided in equal parts each side of a perpendicular center thereof shown by the character (o). Upon the side of this frame directly opposite this index, I construct another index to correspond with the one above described. Having one upon each side of this projecting arm of the said frame, is a matter of convenience. This index is for the purpose of adjusting the pointer (h) which may be straight or curved and thereby the bur or cutter (f) in the position required by the operator. The pointer (h) may be seen upon each side of the machine at (h' and h') Fig. 2. These pointers have a point of bearing upon the bolt (i) Figs. 1 and 2. Below these bearing points in each pointer there is a slot mortise for the purpose of receiving the boxes (g) Fig. 1, and (g', g',) Fig. 2. These boxes contain the shaft upon which is fastened the bur or cutter (f') Fig. 2, and they move up and down in the said slot mortises as the case may require. These bars are connected to the lever (p) Fig. 1, by means of the bolt (o). The lever (p) Fig. 1, has a bearing point at (s). These are coiled springs (q', q') Fig. 2, so arranged over this lever and attached to the end of the index (B), as to act downward upon the lever or cutter (f') by means of the arrangement hereinbefore described.

(l) is the arm of the crank to revolve the bur or cutter (f').

(n', n') Fig. 2, are screws fastening the bars (m' m') to the sliding boxes (g', g'). (t) Fig. 1, is another bar with a slot mortise extending nearly the entire length thereof, and is connected to the lower end of the index pointer (h) and by the set screws (n and j) to the lower end of the frame (A). This is for the purpose of aiding the set screw (j) to firmly hold the said index pointers in their required place.

(a', a') Fig. 2, are blocks, each side of the saw (e), and are so arranged as to conform to any thickness of any saw, which is done by the use of the set screw (b'), when adjusted to the saw, then by moving the lever (c') the eccentric is brought to bear against (a') and thereby firmly secures the saw in the machine ready for the operation of cutting away the gum. The set screw (j) Fig. 1, connects the pointer (h) with the pointer upon the side opposite by means of passing through the circular mortise (c).

Having thus described the nature and construction of my invention I will describe its operation, which is simple and easy.

The lower part of the frame (A) is set over the saw and there securely fastened by means of the blocks (a', a'), the set screw (b'), and the eccentric at the lower end of the lever (c'), then by the use of the crank (l'—r'), the cutter or bur (f') is made to revolve upon that portion of the saw between the teeth to be cut away, first having given the direction for the said cutter or bur to cut, by the means of the index (B), the pointer (h) and the bar (t), while having been done and securely fastened by means of the various set screws, the work commences, and so the operation continues between each and every tooth of the saw so to be cut or "gummed."

Having thus described the nature, construction and operation of my invention, what I claim and desire to secure by Letters Patent, is,

1. The arrangement and combination of the lever ($p$) with the sliding box ($g$) by means of the bar ($m$) so as to give a continued and downward action upon the cutter or bur ($f'$) by the use of the coiled springs ($q'$ $q'$), thereby feeding the said cutter or bur, as and for the purpose herein described.

2. The arrangement and combination of the index pointers ($h'$, $h'$,) with the index (B) and the bars ($t$, $t'$) connected to the frame (A) so as to give any required direction to the cutter or bur ($f'$) as and for the purpose herein set forth.

3. I also, claim the use of the set screw $b'$ by means of which the distance between the blocks ($a'$ $a'$) is adjusted proportionally to saw plates of different thicknesses, prior to being fastened thereto by the eccentric lever ($c$ $c'$).

In testimony whereof I have, on this 18th day of Jan. 1859, set my hand.

WILLIAM PORTER.

Witnesses:
A. H. EMERY,
ORVILLE PORTER.